United States Patent [19]

Meyer

[11] Patent Number: 4,704,287

[45] Date of Patent: Nov. 3, 1987

[54] PROTEIN-PROTECTED RUMINANT FEEDS

[75] Inventor: Edwin W. Meyer, Chicago, Ill.

[73] Assignee: Central Soya Company, Inc., Fort Wayne, Ind.

[21] Appl. No.: 825,194

[22] Filed: Feb. 3, 1986

Related U.S. Application Data

[63] Continuation-in-part of Ser. No. 523,653, Aug. 15, 1983, Pat. No. 4,664,905, which is a continuation-in-part of Ser. No. 435,697, Oct. 21, 1982, abandoned.

[51] Int. Cl.$^4$ ................................................ A23K 1/18
[52] U.S. Cl. ...................................... 426/74; 426/630; 426/807
[58] Field of Search ................. 426/74, 623, 630, 636, 426/807; 514/494; 530/345

[56] References Cited

U.S. PATENT DOCUMENTS

| | | | |
|---|---|---|---|
| 2,512,537 | 6/1950 | Zellers | 426/74 |
| 3,463,858 | 8/1969 | Anderson | 514/494 |
| 4,172,072 | 10/1979 | Ashmead | 530/345 |

FOREIGN PATENT DOCUMENTS 2704746  10/1977  Fed. Rep. of Germany ........ 426/74

*Primary Examiner*—R. B. Penland
*Attorney, Agent, or Firm*—Allegretti, Newitt, Witcoff & McAndrews, Ltd.

[57] ABSTRACT

This invention encompasses protein-protected ruminant feed comprising a pelleted admixture of unhydrolyzed proteinaceous meal and a ruminant-edible water-soluble zinc salt providing zinc ions in aqueous solution, said zinc salt being present in an amount providing a 0.25 to 1.3% zinc ions based on the dry weight of the proteinaceous meal, this feed having been prepared by intermixing said zinc salt with said proteinaceous meal, and forming the mixture into pellets. The large amount of zinc protects protein in the rumen of cattle and provides for more efficient utilization of feed protein.

9 Claims, No Drawings

PROTEIN-PROTECTED RUMINANT FEEDS

RELATED APPLICATIONS

This application is a continuation-in-part of my co-pending application Ser. No. 523,653, filed Aug. 15, 1983 U.S. Pat. No. 4,664,905, which was a continuation-in-part of then co-pending application Ser. No. 435,697, filed Oct. 21, 1982, now abandoned.

FIELD OF INVENTION

The field of this invention relates to improving the nutritive value of soybean meal and other proteinaceous meals for feeding to ruminants. More particularly, the invention is concerned with protecting the protein of proteinaceous meals from rumen digestion.

BACKGROUND OF INVENTION

It has been recognized for some time that protein-providing feed materials which are subject to digestion in the rumen are thereby deleteriously altered in their feeding value. It has been proposed that ideally the protein component of the ruminant feed should be "protected" against being solubilized or metabolized in the rumen, passing therethrough in substantially undegraded form, while remaining digestable and metabolizable in the post-rumen digestive system of the cattle or sheep. The development of a practical way for applying this concept to ruminant nutrition has proven difficult. U.S. Pat. No. 3,619,200 proposes the application to the vegetable meal or other proteinaceous ruminant feed material of a rumen resistant coating. The purpose of the coating is to protect the proteinaceous feed from microbial attack in the rumen while decomposing and permitting digestion of the feed within the abomasum and small intestine.

It is also known that the solubility of protein in ruminant feed materials can be reduced by treating the feed materials with tannin, formaldehyde, or other aldehydes. In addition, a reduction in protein solubility can be obtained by heating the protein. These procedures are summarized with literature references thereto in U.S. Pat. No. 4,186,213. Feed materials which may be treated by one or more of these procedures to reduce the solubility of the protein in the rumen and to protect against rumen destruction are disclosed as including various vegetable meals.

With reference to feeding value lost by rumen destruction, soybean meal has a relatively low protein efficiency value. See Klopfenstein, *Feedstuffs*, July, 1981, 23-24. Since soybean meal is one of the major protein-containing feed materials used with ruminants, it is particularly desirable to provide a commercially practical means for protecting soybean meal against rumen destruction while leaving the protein thereof subject to post-ruminal digestion and metabolism. For large scale commercial use such a method must be simple, efficient, and of relatively low cost. Such a method should be capable of being integrated with present commercial processing of soybeans to produce soybean feed materials.

Other prior art references of interest are Hudson et al. (1970), *J. Anim. Sci.*, 30:609-613; Tagari et al. (1962), *Brit. J. Nutr.*, 16:237-243; Anderson U.S. Pat. No. 3,463,858 (1969); Emery et al. U.S. Pat. No. 2,295,643 (1942); and Ashmead U.S. Pat. No. 4,172,072 (1979).

Hudson et al. describe an experimental comparison in lambs of postruminal nitrogen utilization of commercial soybean meal (72% N soluble) with meal heated 4 hours at 140° C. (35% N soluble). The results suggest that the heated meal was degraded at a slower rate by ruminal microorganism.

Tagari et al. compared solvent extracted soybean meals of different heat exposures. These included room temperature solvent removal, solvent removal at 80° C. for 10 minutes, and commercial toasted meal steamed at 120° C. for 15 minutes. The meals were fed to rams and rumen liquor samples were tested. Artificial rumen comparisons for ammonia liberation were also made. It was concluded that results clearly showed "that the main factor determining the different efficiencies of process to non-process soybean meals is their different solubility in rumen liquor." It was also observed that changes in solubility caused by different heat treatments of soybean meal are relatively large in comparison with other meals.

Anderson discloses a procedure for preparing a growth factor for feeding domestic animals and poultry. A zinc salt in aqueous solution such as zinc chloride or zinc sulfate is reacted with free amino acids in a proteinaceous feed material. The reaction is carried out in an aqueous solution at a temperature of 60°-70° C. (140°-158° F.) and a pH of 3.5, which pH is said to be achieved automatically with $ZnCl_2$, an adjustment of pH with HCl being used with other zinc salts. The reaction mixture is dried to a moisture content of 2-8%, and mixed with the feed ration. There is no reference to the feeding of ruminants, or to rumen protection of protein.

Emery et al. describes a process in which mineral compounds including zinc and other polyvalent metal oxides, hydroxides, and salts are reacted with proteinaceous feed materials in the presence of water and a protein splitting acid such as $H_2PO_4$, HCl, or $H_2SO_4$. The reacted mixture is dried by heating in air. Soybean meal is indicated as the preferred feed material and zinc is among the metals referred to for use in the form of oxides, hydroxides, or carbonates. Other salts, such as cobalt, are indicated as being used in the form of chlorides or sulfates. The examples illustrate the reaction of large amounts of the metal compounds with soybean meal (Ex. I, 35% and Ex. III, 17%, based on the meal). There is no reference in this patent to either rumen protection or nutritional value.

Ashmead proposes the use of metal proteinates for supplying mineral deficiencies in humans and animals. The proteinates are prepared by reacting bivalent metal salts at an alkaline pH with free amino acids of enzyme-hydrolyzed proteins.

Zinc compounds of limited water solubility such as zinc oxide and zinc carbonate have heretofore been employed for supplying micronutrient zinc to ruminants. The utilization of zinc as a micronutrient is post-ruminal and the amount of zinc required as a micronutrient for cattle is quite small, typically about 50 to 150 ppm based on the total daily diet. Small amounts of zinc are present in cattle feed materials, such as proteinaceous oil seed meals, ranging from 25 to 150 pm. Lease and Williams, *Poultry Science*, 46:233-241, Table 1 at 2364 (1967).

The toxicity of high levels of zinc oxide has been studied: Miller et al., *J. Dairy Sci.*, 48:450-453 (1966); Ott et al. *J. Anim. Sci.*, 25:414-438 (1966). These investigators tested zinc oxide in admixture with ruminant feed materials in amounts greater than micronutrient levels.

Miller et al. fed amounts of zinc to lactating dairy cattle up to 2000 ppm based on the feed concentrate (1279 ppm for total diet). No beneficial effect on milk production was observed by the increased ZnO in the diet. Ott et al. fed lambs pelleted rations containing from 0.5 to 4.0 grams of zinc per kilogram of diet, and beef cattle from 1.0 to 3.0 grams zinc per kilogram of diet. These rations included soybean meal. Lambs receiving 0.5 to 1.0 grams zinc gained somewhat faster than the controls, but no increase in rate of weight gain was observed for the beef cattle. Ott et al. reported that steers were less adversely affected by high levels of zinc than heifers.

SUMMARY OF INVENTION

The protein-protected ruminant feed of this invention comprises a pelleted admixture of unhydrolyzed proteinaceous meal in a ruminant-edible water-soluble zinc salt providing zinc ions in aqueous solution. Zinc salt is present in an amount providing 0.25 to 1.3% zinc ions based on the dry weight of the proteinaceous meal. The feed is prepared by intermixing the zinc salt with the proteinaceous meal, and forming the conditioned mixture into pellets. Prior to pelleting the mixture is preferably conditioned with steam. Such pelletizing prereacts the zinc ions with the protein of the meal. The proteinaceous meal, such as soybean meal or other defatted oilseed meal, may comprise the only feed ingredient of the admixture, or the proteinaceous meal may be combined with other feed ingredients. The watersoluble zinc salt may be intermixed with the proteinaceous meal as a dry powder or in the form of an aqueous solution.

The pelleted ruminant feed prepared as described above can be fed to dairy cattle to increase milk production in relation to protein intake. It can also be fed to beef cattle to increase their rate of weight gain in relation to protein intake. In general, a lesser amount of the proteinproviding meal will be required when used with the watersoluble zinc salt in the manner described. For example, the same milk production may be obtained with dairy cattle using a 15% protein feed containing the zinc salt as compared with an 18% protein feed without the zinc salt.

DETAILED DESCRIPTION

The method of this invention may be practiced with a variety of proteinaceous vegetable seed meals, or related seed materials, such as wheat midlings, brewer's grains or distillers grains which are by-products of fermentation of barley, corn, and other seed grains. Oil seed meals, which are usually in defatted form, include soybean meal, cottonseed meal, peanut meal, sunflower meal, Canola (rapeseed) meal, palm kernel meal, and linseed meal. The proteinaceous meals are used in their natural unhydrolyzed state, and mixtures of meals can be used. The method of this invention is especially advantageous when applied to defatted toasted soybean meal.

Proteinaceous meals of animal or microbiological origin can also be used. Related proteinaceous feed components include animal by-product materials such as fish meal, meat-bone meal, as well as single cell protein materials such as yeast cells or bacterial cells resulting from fermentation processes. The term "single cell protein" refers to dried deactivated micro-organisms used as animal feedstuffs.

The desired reaction is between the protein and the zinc reagent. The nature of this reaction is not known with certainty. Binding of the zinc to the protein has been confirmed. The meal does not need to contain free amino acids (FAA). Any free amino acids present are believed to be immaterial to the process. The meals are used in their natural unhydrolyzed condition. Vegetable meals and other proteinaceous defatted vegetable seed materials for use in the method of this invention will ordinarily not contain less than 1% FAA, based on FAA weight per dry weight of the meal.

The zinc treating agent is preferably zinc chloride or sulfate, but other ruminant-edible water-soluble zinc salts can be used, such as zinc acetate. Preferably the zinc ions of the salt are brought into intimate contact with the protein of the meal which is subject to rumen degradation. This may be accomplished by applying the zinc salt in an aqueous solution which is mixed with the meal and absorbed thereby. Alternatively, the zinc salt can be dry mixed with the meal if sufficient moisture is present in the meal or added thereto to dissolve a substantial amount of the zinc salt.

An alternative preferred procedure involves dry blending of the zinc salt and the proteinaceous meal. The zinc salt and the meal are intermixed to obtain a substantially uniform dispersion of the zinc salt in the meal. The resulting admixture is then conditioned by direct contact with steam, the conditioning being carried out in the same manner as presently used for pelleting ruminant feed mixtures. Following the conditioning of the admixture, it is formed into pellets, such as by standard feed pelleting equipment. While the zinc salt may be intermixed as an aqueous solution thereof prior to steam conditioning and pelletizing, this is not required for effective rumenprotection of the protein. The sequence of steam conditioning and pelletizing achieves an effective pre-reaction of the zinc salt with the protein of the meal to provide rumen protection of the protein and thereby upgrade the nutritive value of the pelleted feed.

When zinc chloride is the reagent employed, from 0.6–2.7% of the zinc salt can be used based on the dry weight of the meal being treated. Corresponding molar equivalent amounts of other zinc salts can be used. A preferred range is from 0.8–2.2% of zinc chloride based on the dry weight of the meal. More generally, on a zinc element or zinc ion basis, the zinc salt may be used in an amount corresponding to 0.25–1.3% zinc based on the dry weight of the meal, and preferably from 0.4–1.10% zinc on the same basis. Higher levels of zinc can be used but are not needed. Large excesses of zinc should be avoided. The zinc salts should not be used in amounts which are toxic to ruminants. Meal "dry weight" refers to the oil-free, moisture-free weight of the meal, which can also be referred to as "dry matter weight."

The initial mixing of the zinc salt powder or zinc salt solution with the meal can be carried out at ordinary room temperatures (viz. 60°–90° F.). The mixing, absorption, and intimate contacting of the zinc salt solution with the protein apparently causes the zinc to react with the protein in such a way as to protect the protein against rumen destruction. As described above the results are comparable by using dry blending followed by steam conditioning and pelleting. The mechanism involved is not known with certainty. Available evidence indicates that the desirable reaction, which is believed to be the reaction of the zinc ions with the protein, can be promoted by heating the feed material after it has absorbed the zinc chloride solution. This can occur prior to or during pelleting.

The protein-protected ruminant feeds of this invention, and their use in feeding ruminants, is further illustrated by the following examples.

EXAMPLE I

The following is an example of a control and two zinc chloride-treated pelleted dairy feeds, all having a protein content (N×6.25) of about 20%.

The basic composition of each feed was as follows:

| Component | Quantity, Lbs. |
|---|---|
| Ground corn | 113.2 |
| Standard wheat mids | 116.0 |
| Toasted soybean meal | 102.8 |
| Lignin sulfate | 15.2 |
| Ground limestone | 3.7 |
| Calcium sulfate | 3.3 |
| Magnesium oxide | 1.0 |
| Sodium bicarbonate | 6.0 |
| Fat | 6.8 |
| Molasses | 31.2 |
| Micro mineral and vitamin mix | 0.636 |

In preparation of the control batch (no treatment), the ingredients, with the exception of the fat and molasses, were mixed in a vertical twin screw mixer. The mixer was run for six minutes prior to the addition of the fat and molasses. Mixing was continued for a total of 12 minutes. The mixture was then dropped to a supply bin for the steam conditioner. The feeder rate to the conditioner was set at 23 (on a scale of 1–50). The conditioning was done by direct steam addition through a steam control valve set at 1.1 turns (steam pressure—36 lbs.). The pelleting proper was done with a pellet mill using a 11/64"×2¼" die. The mix temperature to the conditioner was about 74° F., and to the die, about 128° F. In the die further heating occurred increasing the temperature of the mix an estimated 20° to 30° F., that is, to 148° to 158° F. The pellets were then conveyed to a vertical cooler and then to a bin wherein the pellets were within 15° F. of ambient temperature.

Two additional 400 lb. batches were made in this fashion with the exception that one was treated with 1 lb. (0.25%) of anhydrous zinc chloride, and the other with 2 lb. (0.5%) of anhydrous zinc chloride, which were added as dry powders. The conditioning steam provided moisture for partial or complete dissolving of the added zinc salt. In each instance, the zinc chloride was mixed for 10 minutes with the protein-containing ingredients (corn, wheat mids, and soybean meal) before continuing with the process described above.

Samples of these pelleted dairy feeds were crushed and examined for resistance to enzyme degradation by the ADIN and Enzyme Indigestibility procedures. Also proximate analyses and zinc analyses were run. The results are summarized below in Table A.

TABLE A

| Feed Treatment | H$_2$O % | Protein % | Fat % | Zinc ppm |
|---|---|---|---|---|
| Control | 11.36 | 20.82 | 4.12 | 50 |
| 0.25% ZnCl$_2$ | 11.2 | 21.46 | 3.72 | 940 |
| 0.50% ZnCl$_2$ | 9.92 | 21.85 | 3.66 | 1719 |

| Feed Treatment | % Enz. Indigest. N[a] | ADIN[b] |
|---|---|---|
| Control | 36.25 | 3.58 |
| 0.25% ZnCl$_2$ | 45.30 | 3.45 |
| 0.5% ZnCl$_2$ | 59.62 | 3.34 |

[a]Enzyme insoluble nitrogen as percent of total nitrogen - indicator of extent of rumen bypass. See Poos et al., J. Anim. Sci., Abstract 679, p. 379 (1980), and Rock et al., J. Anim. Sci., Abstract 121, p. 118 (1981).
[b]Acid detergent insoluble nitrogen as percent of total nitrogen - indicator of amount of nitrogen (protein) completely unavailable to ruminant. See Goening et al., Annual Meeting of ADSA, Gainesville, FL; June, 1970; and Agricultural Handbook No. 379, p. 11, ARS, USDA, Jacket No. 387-598.

EXAMPLE II

A small herd milk production trial was carried out using the pelleted dairy feeds treated with 0.5% zinc chloride prepared as described in Example I. The herd consisted of 31 Holstein cows of various times post-partum. The pelleted feed was fed ad libitum. Corn silage was also fed ad libitum. Further, each cow was fed alfalfa-orchard grass hay at 6 lbs/day. During the conditioning and baseline period, the cows were fed an 18% untreated protein ration for 10 days. The average milk production per cow was 58.6 lbs. per day with 4.82 ppm zinc in the milk. During the next period of 40 days, the cows were fed the zinctreated (0.5% zinc chloride) feed, with a total protein content of 15%. The milk production averaged 58.1 lbs. per cow per day with a zinc content in the milk of 5.55 ppm. The trial ended with 27 cows because of drying off.

This trial demonstrated that milk production was not adversely affected even though feed protein content is dropped significantly (18% to 15%) if the feed is treated with zinc chloride. Further, there was no significant pass through of the zinc into the milk.

EXAMPLE III

Another ruminant trial to study the impact of zinc salt-treated dairy feed protein concentrate on milk production was carried out.

In this trial an average of 26 Holstein cows in late lactation were used. The feeding program was divided into two phases (a) a control phase of 30 days with nontreated feed to establish the normal milk-volume production, and (b) a phase wherein treated protein was used to determine its effect upon milk-volume production.

In each phase the cows were fed 12 pounds of alfalfa, hay and corn silage were fed ad libitum.

In phase 1, a pelleted commercially-prepared dairy concentrate containing 36 percent crude protein was mixed with corn, oats, molasses, trace minerals, and additives to produce a ration containing 14.5 percent crude protein. This was fed at an average of 20 pounds/cow/day.

In phase 2 of the feed program, a pelleted dairy feed concentrate was prepared using zinc chloride-treated (at 1.5% level) toasted soybean meal. Preparation was as described in Example I. with the concentrate containing 38 percent crude protein. This was mixed with the same ingredients recited for phase 1, and such mixing resulted in a final feed containing 13.2 percent crude protein. This was fed at the same rate as in Phase 1. All other factors were the same.

The results of the ruminant trial were as follows:

| Phase 1 | 49.2 lb milk/cow/day averaged over 30 days |
|---|---|
| Phase 2 | 51.7 lb milk/cow/day averaged |

-continued over 50 days

This trial demonstrates that the zinc salt treated dairy feed results in increased milk production. Moreover, this is accomplished with less crude protein in the total feed; 13.2 percent vs. 14.5 percent.

EXAMPLE IV

High protein feed supplements containing from 20 to 60% protein (dry matter basis) can be prepared as pelleted feeds. The amount of zinc salt employed is preferably 0.015 times the weight percent protein in the meal. These preferred amounts of zinc are illustrated below with respect to representative proteinaceous meals.

TABLE B

| Proteinaceous Meals | % Protein(*) | % Zinc |
| --- | --- | --- |
| Rapeseed | 35 | 0.525 |
| Sunflower | 28 | 0.420 |
| Cottonseed | 41 | 0.615 |
| Peanut | 50 | 0.750 |
| Safflower | 21 | 0.315 |
| Coconut | 20 | 0.300 |
| Fish Meal | 58 | 0.870 |
| Meat & Bone Meal | 50 | 0.750 |
| Linseed | 34 | 0.510 |
| Soybean | 48 | 0.720 |

(*)Protein determined as N × 6.25

In preparing the feed supplement, the zinc salt powder is dry blended with the meal, the mixture is steam conditioned, and then pelleted, using standard conditioning and pelleting equipment.

I claim:

1. A protein-protected ruminant feed comprising a pelleted admixture of unhydrolyzed proteinaceous meal and a ruminant-edible water-soluble zinc salt providing zinc ions in aqueous solution, said zinc salt being present in an amount providing 0.25 to 1.3% zinc ions based on the dry weight of the proteinaceous meal, said feed having been prepared by intermixing said zinc salt with said proteinaceous meal, and forming the mixture into pellets.

2. The ruminant feed of claim 1 in which said pelleted admixture is consisting essentially of said unhdrolyzed proteinaceous meal and said zinc salt.

3. The ruminant feed of claim 1 in which said pelleted admixture is composed of said unhydrolyzed proteinaceous meal in admixture with other feed ingredients.

4. A protein-protected ruminant feed comprising a pelleted admixture of unhydrolyzed proteinaceous meal and a ruminant-edible water-soluble zinc salt providing zinc ions in aqueous solution, said zinc salt being present in an amount providing 0.25 to 1.3% zinc ions based on the dry weight of the proteinaceous meal, said pelletized admixture being consisting essentially of said unhydrolyzed proteinaceous meal and said zinc salt, said proteinaceous meal being selected from the group consisting of soybean meal, rapeseed meal, sunflower meal, cottonseed meal, peanut meal, safflower meal, and palm kernel meal, and mixtures thereof, said feed having been prepared by intermixing said zinc salt with said proteinaceous meal, conditioning said mixture with steam to prepare it for pelleting, and forming the conditioned mixture into pellets.

5. The ruminant feed of claim 4 in which said proteinaceous meal is defatted toasted soybean meal.

6. The ruminant feed of claim 4 in which said zinc salt is intermixed with said unhydrolyzed proteinaceous meal as a dry powder.

7. The ruminant feed of claim 4 in which said zinc salt is intermixed with said unhydrolyzed proteinaceous meal as an aqueous solution.

8. The ruminant feed of claim 1 or claim 4 in which said zinc salt is zinc sulfate.

9. The ruminant feed of claim 1 or claim 4 in which said zinc salt is zinc chloride.

* * * * *

UNITED STATES PATENT AND TRADEMARK OFFICE
CERTIFICATE OF CORRECTION

PATENT NO. : 4,704,287
DATED : 11/3/87
INVENTOR(S) : Edwin W. Meyer

It is certified that error appears in the above-identified patent and that said Letters Patent is hereby corrected as shown below:

Column 2, line 63, replace "2364" and substitute --236--.

Column 3, line 18, replace "in" and substitute --and--.

Column 4, line 8, delete "not".

Signed and Sealed this

Twenty-first Day of June, 1988

Attest:

DONALD J. QUIGG

*Attesting Officer*

*Commissioner of Patents and Trademarks*